US005480597A

United States Patent [19]

Ishida et al.

[11] Patent Number: 5,480,597

[45] Date of Patent: Jan. 2, 1996

[54] METHOD FOR BLENDING A GAS INTO A HIGH VISCOSITY LIQUID

[75] Inventors: Koichi Ishida; Teruyuki Nakagawa; Takehiro Watanabe, all of Chiba, Japan

[73] Assignee: Dow Corning Toray Silicone Co., Ltd., Tokyo, Japan

[21] Appl. No.: 310,603

[22] Filed: Sep. 22, 1994

[30] Foreign Application Priority Data

| | | | |
|---|---|---|---|
| Sep. 28, 1993 | [JP] | Japan | 5-241798 |
| Sep. 28, 1993 | [JP] | Japan | 5-241800 |
| Oct. 6, 1993 | [JP] | Japan | 5-250645 |

[51] Int. Cl.$^{6}$ .......... B29C 44/34

[52] U.S. Cl. .......... 264/40.4; 264/50; 261/DIG. 26; 366/152.1; 366/162.1; 366/179.1; 366/182.4

[58] Field of Search .......... 425/145; 264/50, 264/40.4; 366/101, 106, 152.1, 162.1, 179.1, 182.4; 261/DIG. 26

[56] References Cited

U.S. PATENT DOCUMENTS

| | | | |
|---|---|---|---|
| 4,259,402 | 3/1981 | Cobbs, Jr. et al. | 264/50 |
| 4,391,765 | 7/1983 | Lee et al. | 264/50 |
| 4,778,631 | 10/1988 | Cobbs, Jr. et al. | 425/4 R |
| 4,779,762 | 10/1988 | Klein et al. | 425/145 |
| 5,139,715 | 8/1992 | Katsuno et al. | 264/46.4 |
| 5,175,171 | 12/1992 | Shinmi et al. | 521/79 |
| 5,207,352 | 5/1993 | Porter et al. | 221/1 |
| 5,330,724 | 7/1994 | Bauman et al. | 422/133 |

FOREIGN PATENT DOCUMENTS

| | | | |
|---|---|---|---|
| 0259567 | 3/1988 | European Pat. Off. | B29C 47/10 |
| 0605138 | 7/1994 | European Pat. Off. | B05B 7/32 |
| 1200165 | 12/1959 | France . | |
| 1505772 | 12/1967 | France . | |
| 568782 | 11/1975 | Germany | G05D 11/03 |
| 3818760 | 6/1988 | Germany | G05D 11/02 |
| 61-42326 | 2/1986 | Japan | B01F 15/04 |

*Primary Examiner*—Allan R. Kuhns
*Attorney, Agent, or Firm*—Paula J. Lagatutta

[57] ABSTRACT

The objectives of the present invention are achieved by preparing a foamable composition comprising a viscous liquid and a gas homogeneously dispersed in the liquid. The compositions are prepared by blending a pressurized gas with the viscous liquid in a mixing chamber. In accordance with the present method the flow rate of the pressurized gas into the mixing chamber is controlled as a function of the flow rate of at least one high viscosity liquid into said chamber. The apparatus includes a means for controlling the flow rate of the pressurized gas as a function of either the difference in the feed pressures of said gas and said liquid or a predetermined ratio of the volumes of liquid and gas present in said mixing chamber.

10 Claims, 6 Drawing Sheets

METHOD FOR BLENDING A GAS INTO A HIGH VISCOSITY LIQUID

BACKGROUND OF THE INVENTION

1. Field of the Invention

The present invention relates to a method for obtaining a homogeneous dispersion of a pressurized gas in a high-viscosity liquid. More particularly, this invention relates to a method and associated apparatus for the controlled blending of a pressurized gas with a high viscosity liquid composition in a mixing chamber equipped with separate inlets for these two ingredients. The gas is distributed throughout resultant foamed mixture as bubbles with a uniformly small size and distribution that are consistent as a function of time. The viscous liquid is preferably a curable organosiloxane composition.

2. Background Information

Within the art of foam fabrication by mixing and reacting a high-viscosity liquid base agent with a liquid curing agent and the simultaneous evolution of a gas as a reaction by-product, the present applicants have filed U.S. patent application Ser. No. 08/173,312 on Dec. 23, 1993. The invention described in this application is a method for preparing foams from curable organosiloxane compositions. The objective of the method described in this application is the production of high-expansion-ratio foams having a uniform distribution of small cells. In accordance with the method described in this application, rapid bubble growth by the reaction gas is suppressed by the addition to the composition prior to curing of a small amount of inert gas into, for example, the base portion of the curable composition.

During their investigations into the fabrication of such homogeneous high-expansion-ratio foams, the inventors found that additional improvements in dispersing the small amount of inert gas that is blended into the viscous liquid were capable of yielding additional improvements in the quality of the cell dispersion in the cured foam.

Methods for mixing pressurized gases into high-viscosity liquids are already known from the production of whipped cream and urethane foams. However, as shown in the data plots that form part of the accompanying drawings it has been very difficult to obtain uniform gas-liquid mixtures when pressurized gases are blended into high-viscosity liquids.

Figure 9:
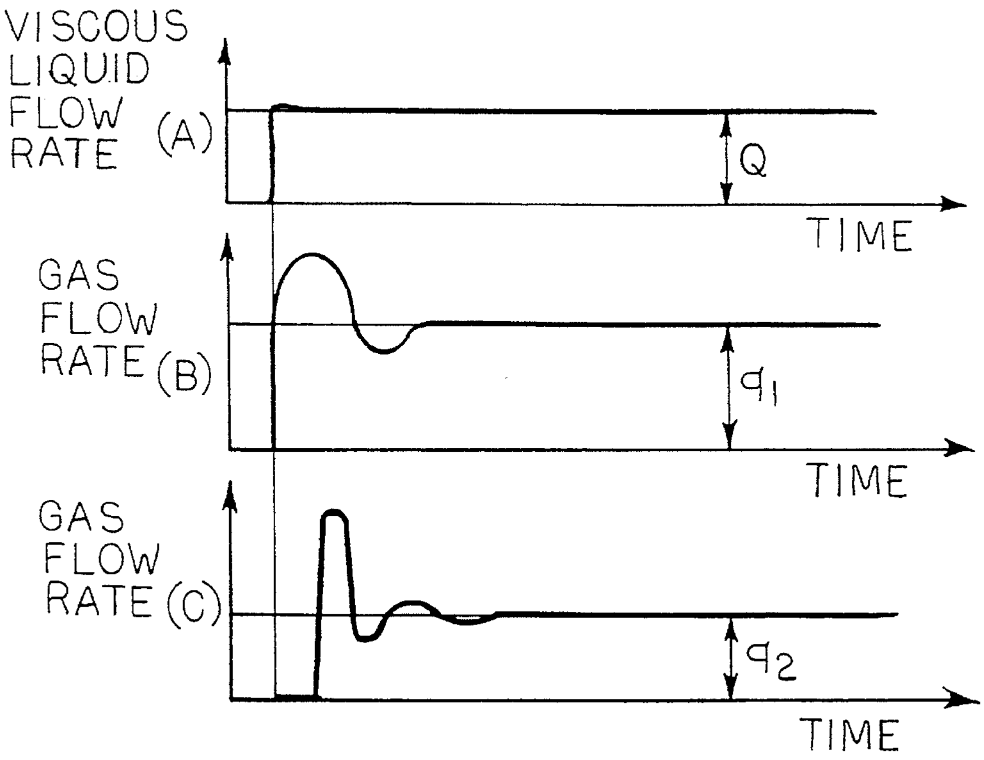
FIGS. 9(A), 9(B) and 9(C) are plots showing the flow rates of the high-viscosity liquid and pressurized gas as a function of time during continuous feed in accordance with prior art methods for injecting a pressurized gas into a viscous liquid.

In the specific cases illustrated in FIG. 9 of the accompanying drawings, plot A shown that when a pressurized gas is blended into at a relatively high flow rate q1 with a high-viscosity liquid that is being supplied at flow rate Q, an overshoot phenomenon, referred to as a surge, occurs during which excess pressurized gas is blended in during the initial injection period. When, on the other hand, the pressurized gas is admixed at a lower flow rate q2, plot C in FIG. 9 demonstrates that a surge again occurs, but this time in combination with a delay in mixing into the high-viscosity liquid after the start of gas injection.

As a result of these "overshooting" or surge phenomena, the foam obtained during the initial period of pressurized gas injection exhibits a non-homogeneous cell distribution and a non-uniform expansion ratio. This has required that at least the initial foam output be discarded.

The surges and delays shown in the plots of FIG. 9 become critical problems when the high-viscosity liquid and pressurized gas are introduced intermittently, as would occur during production of foam articles on a batch rather than a continuous basis.

Figure 10:
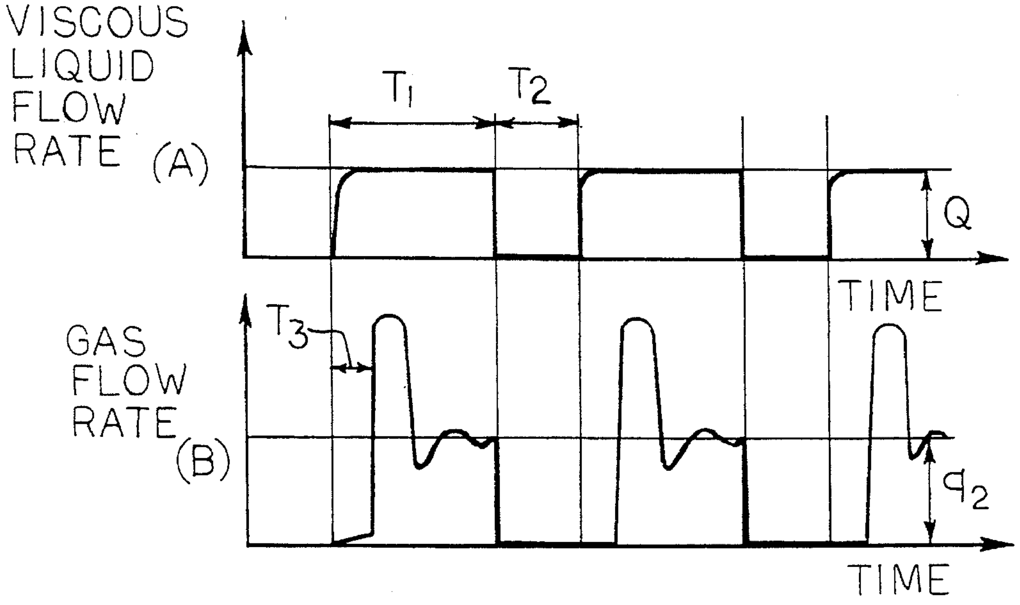
FIGS. 10(A) and 10(B) are plots showing the flow rates of the high-viscosity liquid pressurized gas as a function of time during intermittent feed in accordance with prior art methods for injecting a gas into a pressurized liquid.

In the case of intermittent feed of the high-viscosity liquid as shown in plot A of FIG. 10 and characterized by cycling between a feed period T1 and an off period T2, during the synchronous injection and mixing of the pressurized the plot of gas flow rate as a function of time shows a substantial surge in gas flow rate following a time lag T3 after the start of the high-viscosity liquid feed. These phenomena make it almost impossible to produce a uniform foam product.

One objective of the present invention is to provide a method and an apparatus capable of producing a series of uniform dispersions of a pressurized gas as uniformly small bubbles in a high-viscosity liquid. The internal structure of the dispersion is consistent over the entire gas injection cycle, which can be repeated at a predetermined rate.

SUMMARY OF THE INVENTION

The objectives of the present invention are achieved by controlling the flow rate of a pressurized gas as a function of the flow rate of at least one high viscosity liquid. The gas and the liquid(s) are simultaneously fed into a mixing chamber wherein these ingredients are blended in a predetermined volume ratio to form a foamable composition. The apparatus includes a means for controlling the flow rate of the pressurized gas as a function of either the difference in the feed pressures of said gas and said liquid(s) or said predetermined volume ratio.

In one embodiment of the present method the flow of pressurized gas into the mixing chamber begins up to one second prior to introduction of said liquid into the chamber during each cycle of liquid flow. In all embodiments of the present apparatus, the cycles of liquid and gas flow in the respective supply lines are coordinated with the locating under the outlet nozzle of the apparatus of substrates to be coated with the foamable composition.

DETAILED DESCRIPTION OF THE INVENTION

This invention provides a method for preparing and dispensing a foamable composition by blending a pressurized gas with a high viscosity liquid in the mixing chamber portion of an apparatus comprising said mixing chamber to which is connected the outlet of at least one liquid supply line for said liquid, the outlet of a pressurized supply line for the introduction of said gas into said chamber and an outlet nozzle for dispensing said composition from said chamber, wherein said high pressure supply line contains means for regulating the flow of gas in said high pressure supply line to provide a predetermined ratio between the flow rates of said gas and liquid, wherein said means comprise at least one electrically actuated valve that is actuated by a first electrical signal generated by a control element, wherein the presence and duration of said signal is a function of a) a second electrical signal received by said control element, said second signal being a function of the flow rate of said liquid in said liquid supply line and b) a third electrical signal received by said control element that is a function of a predetermined variable selected from the difference between the feed pressures for said gas and said liquid or the ratio between the volumes of said liquid and said gas to be combined in said mixing chamber.

The characterizing feature of the present method is controlling the flow rate of a gas in a pressurized line supplying a mixing chamber by means of at least one valve that is actuated by an electrical signal generated by a control element. The presence and duration of this output signal from the control element is determined by at least two electrical input signals supplied to the control element. One of the input signals is generated by a flow meter located in a liquid supply line for the mixing chamber, and is a function of the flow rate in this line. The second signal is a function of one of two predetermined values. One value is the mixing ratio for the gas and liquids supplied to the mixing chamber. The second predetermined value is the difference between the pressures under which the gas and liquid(s) are supplied to the mixing chamber. In one embodiment of the present apparatus the control element receives a third input signal that is generated by a flow meter located in the pressurized gas supply line and is a function of the flow rate in this line.

Control of the pressurized gas flow in accordance with the present method enables uniform dispersing of the gas in the liquid present in the mixing chamber to yield a dispersion that is consistent over the entire mixing period. This consistency is achieved by eliminating the initial surge of in gas concentration in the mixture and the time lag in achieving the desired gas concentration following start of the high-viscosity liquid flow into the mixing chamber.

Additional improvements in the uniformity of the dispersion and also a reduction in the size of the mixing chamber can be achieved by installing a mixing device in the mixing chamber. The pressurized gas is introduced while the high viscosity liquid is stirred by means of a mixing device, represented by 5 in the accompanying FIGS. 1, 2, 3 and 4. The mixing device can be a kinematic one employing stirring blades as shown in the accompanying figures or a static mixing device.

DETAILED DESCRIPTION OF THE INVENTION

The present method is explained in greater detail with reference to three embodiments of the mixing chamber and associated apparatus depicted in FIGS. 1–5 of the accompanying drawings. This explanation is intended to describe preferred embodiments of an apparatus suitable for carrying out the present method, and should not be interpreted as limiting the scope of the invention defined in the accompanying claims.

FIGS. 1–5 of the accompanying drawings are schematic views of five embodiments of a device suitable for implementing the present method for mixing a gas into a high-viscosity liquid. The output portion of these devices applies a foam gasket (E) along the top edge of a dust cover (D) as a large number of these articles are conveyed to the devices one at a time as part of a continuous operation.

Referring now to the features common to the embodiments shown in FIGS. 1, 2, 3 and 4, 1 refers to a mixing chamber, 2 refers to a storage tank containing a high viscosity base portion (A) of a two-part curable high viscosity liquid composition, 3 refers to a storage tank containing the curing agent portion (B) of the same high viscosity liquid composition, 4A, 4B and the combination of 4C and 27C refer to means for controlling the flow rate of the pressurized gas C. The devices that constitutes these means vary, and will be discussed in detail in connection with the individual embodiments of the present apparatus.

A discharge nozzle 22 is connected to the bottom of the mixing tank 1 via a flexible hose 21.

A robot (not shown) moves the discharge nozzle 22 in a single pass along the perimeter of the top edge of the dust cover D. A foam gasket E is formed by the extrusion through the nozzle and application of a bead of the high-viscosity curable composition formed within the mixing chamber 1.

The mixing and extrusion steps are repeated as each dust cover D is successively moved into position under the discharge nozzle. This operation requires repetitive and intermittent discharge of a stream of high-viscosity curable composition from the mixing chamber 1.

A stirring device 5 driven by a motor 6 is installed in the mixing chamber 1. Liquid transport pumps 7 and 8 are located at the bottom of the storage tanks identified as 2 and 3, respectively. Liquid material from these tanks passes through liquid supply lines 9 and 10 and check valves 11 and 12 to the top of the mixing chamber 1. Check valves 11 and 12 are arranged to permit introduction of high-viscosity liquids A and B into the mixing chamber 1 from supply lines 9 and 10 during discharge of high-viscosity curable composition from discharge nozzle 22 and to discontinue this supply when discharge from the discharge nozzle is discontinued.

A pressurized gas is supplied through supply line 13 and check valve 14 to an outlet located in the central region of the wall of the mixing chamber 1.

Figure 6:
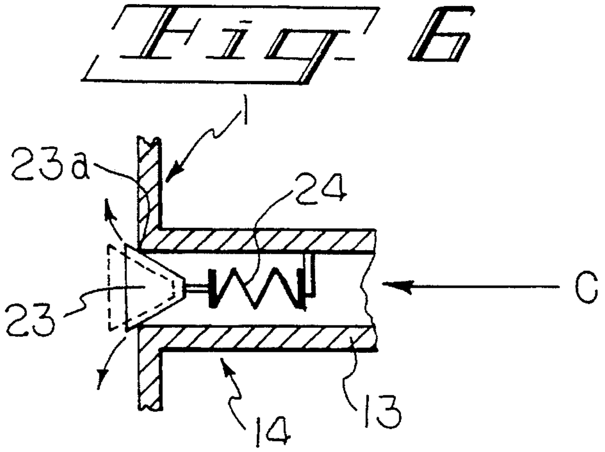
FIG. 6 is a schematic diagram of a check valve located in the pressurized gas and liquid supply lines of the apparatus shown in FIGS. 1, 2, 3 and 4.

FIG. 6 depicts a preferred structure for check valves 11, 12 and 14. In this structure, valve disk 23 is urged toward the closed position by means of a spring 24 located in the gas supply line 13. The conical valve seat 23*a* widens prior to its intersection with the wall surface of the mixing chamber 1. In the closed position, valve disk 23 rests on valve seat 23*a*. During operation of the check valve, the disk enters into and withdraws from the mixing chamber 1 as shown by the dot-and-dash line.

This structure for the check valve avoids retention or stagnation within check valve 14 of the pressurized gas C supplied through pressurized gas supply line 13. It therefore makes possible a uniform discharge of gas into the high-viscosity liquid in the mixing chamber 1 and in this way achieves a further improvement in dispersion of the pressurized gas.

Figure 1:
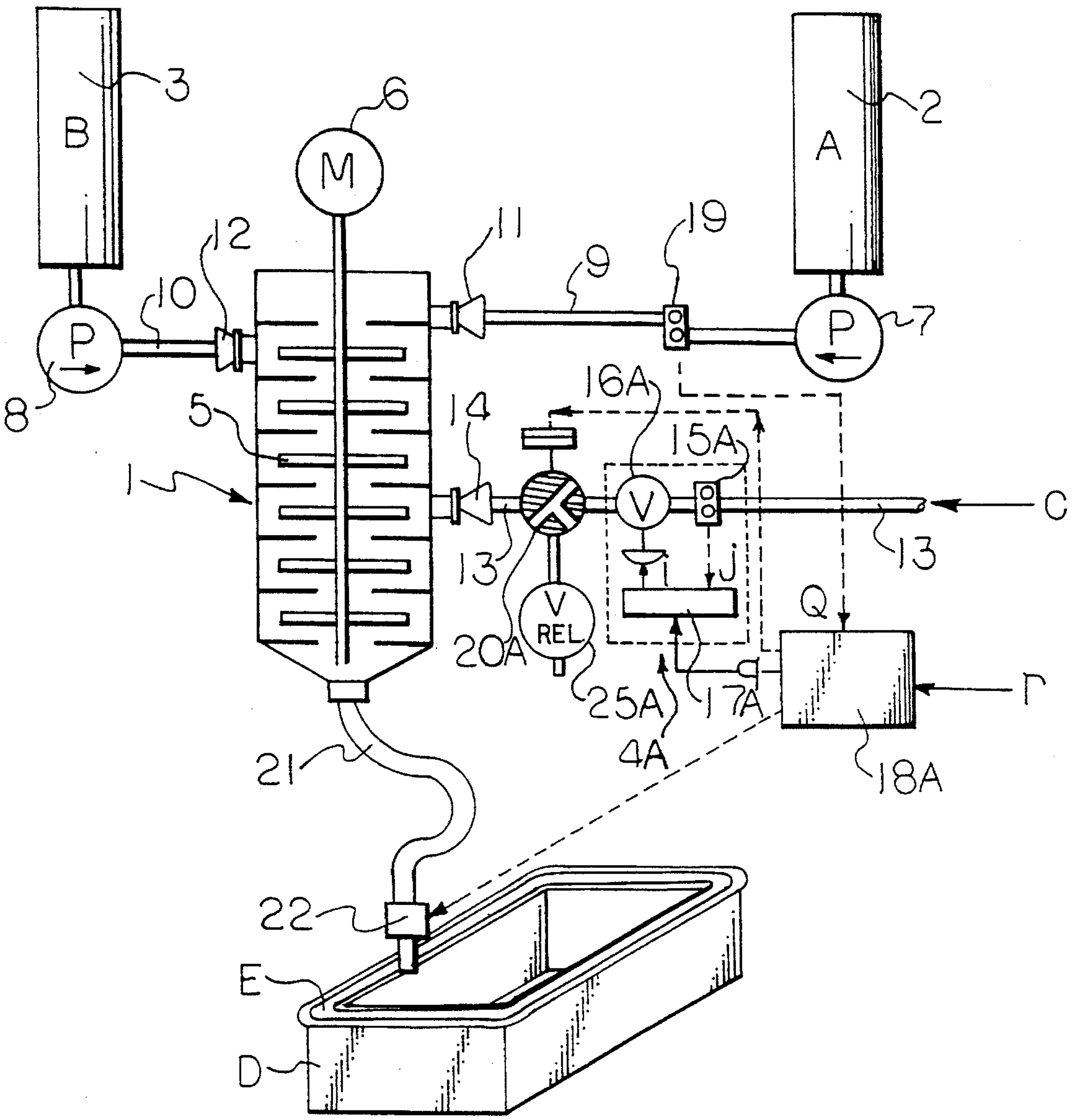
FIGS. 1, 2 and 3 are schematic diagrams of three embodiments of an apparatus useful in implementing the present method.

Embodiment A (FIG. 1)

The flow rate control means 4A located in the pressurized gas supply line 13 of embodiment A of the present apparatus contains a flowmeter 15A and a control valve 16A whose aperture is controlled by an electrical signal i generated by a first control element 17A.

Control element 17A receives a signal q from a second control element 18A and a signal j from flowmeter 15A located in the gas supply line. These result of these two signals is an output signal i that controls the size of the aperture in control valve 16A, located in the gas supply line. The information supplied to the second control element 18A consists of a signal Q based on the flow rate of liquid base portion A, supplied from flowmeter 19 located in the high-viscosity liquid supply line 9, and a signal based on the predetermined mixing ratio r. Control element 18A is programmed to provide a target flow rate q for pressurized gas C as a function of the information received by this control element.

Control element 17A generates a signal i which is based on both the target flow rate q and the flow rate signal j detected by flowmeter 15A. This signal i regulates the size of the aperture in control valve 16A to yield a target flow rate for the pressurized gas.

A three-way switching valve 20A is located in the gas supply line between check valve 14 and control valve 16A. The purpose of valve 20A is to direct the flow of the pressurized gas in the supply line either into the mixing chamber 1 or into the atmosphere. The operation of valve 20A is synchronized with the operation of discharge nozzle 22 by means of a signal from control element 18A. When the discharge nozzle 22 is open, valve 20A directs the gas flow into the mixing chamber. When the discharge nozzle is closed, valve 20A directs the flow of gas into the atmosphere through relief valve 25A. Relief valve 25A is programmed to open when the pressure in the gas supply line exceeds the predetermined pressure under which gas is supplied to the supply line.

More specifically, the three-way valve 20A is synchronized with the switching operations of the discharge nozzle 22 in such a manner that pressurized gas is fed into the mixing chamber 1 only during discharge from nozzle 22 of foamable composition onto the top edge of a dust cover D. In this embodiment of the present apparatus the three-way valve 20A also regulates the timing of injection of pressurized gas into the mixing chamber in such a manner that the start of injection precedes by from 0.1 to 1 second the opening of discharge nozzle 22, which is synchronized with introduction of the high-viscosity liquids A and B into the mixing chamber from the high-viscosity liquid supply lines 9 and 10.

Figure 7:
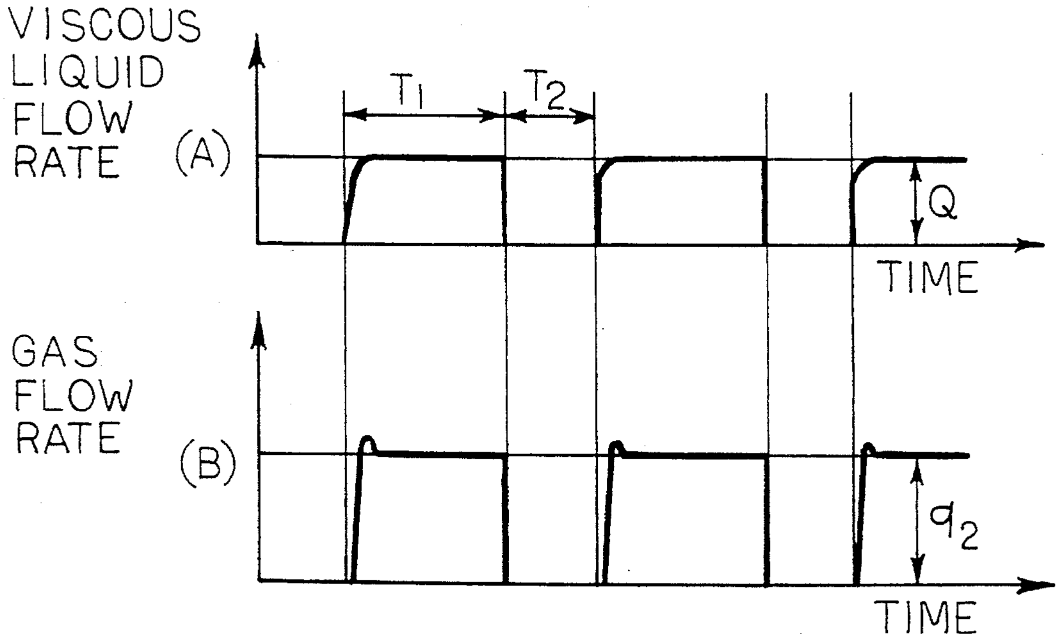
FIGS. 7(A) and 7(B) are plots showing the flow rates of a high-viscosity liquid and a pressurized gas as a function of time during intermittent addition of the high viscosity liquid into a mixing chamber in using the apparatus shown in FIGS. 1 and 3.

In embodiment A described in the preceding paragraphs, high-viscosity liquids A and B, stored in tanks 2 and 3, respectively, are fed through check valves 11 and 12 into the mixing chamber in synchronization with the discharge of foamable composition from nozzle 22. Introduction of the pressurized gas C is controlled as a function of the flow rate of the two liquids to achieve a predetermined mixing ratio. The gas flow is initiated by switching the three-way valve 20A to direct flow through supply line 13 at a point in time that precedes by from 0.1 to 1 second the introduction of base A and curing agent B into the mixing chamber from their respective storage tanks. Creation of this 0.1 to 1 second delay between introduction of the gas and liquid(s) makes possible a uniform injection of the pressurized gas, as shown in plot B of FIG. 7. It is evident from this plot that the flow rate of the pressurized gas does not initially exceed the desired value during intermittent feed of the high-viscosity liquid (feed period T1 and off period T2 shown in plot A of FIG. 7.

Irrespective of the particular apparatus used to regulate the flow of gas in the pressurized supply line, the present method is particularly effective in providing a uniform dispersion of the gas in a high-viscosity liquid when the liquid has a viscosity of at least 1,000 centipoise (1 Pa.s), preferably from 3,000 to 500,000 centipoise (3 to 5 Pa.s). Under these conditions, an even more microscopically dispersed state can be obtained by regulating the flow rate of the pressurized gas in the supply line to achieve a volume ratio of from 0.5 to 50 Ncc of gas per 100 g of high viscosity liquid. These ratios are preferably obtained using a gas flow rates of from 0.02 to 20 Ncc/minute.

The gas volumes are measured at 0° C. and a pressure of 1 atmosphere (760 mm of mercury), also referred to as "standard conditions". Gas volumes measured under these conditions are referred to in the present specification as "Ncc".

The actual flow rate of the gas in the supply line is preferably from 0.02 to 20 Ncc/minute.

Figure 2:
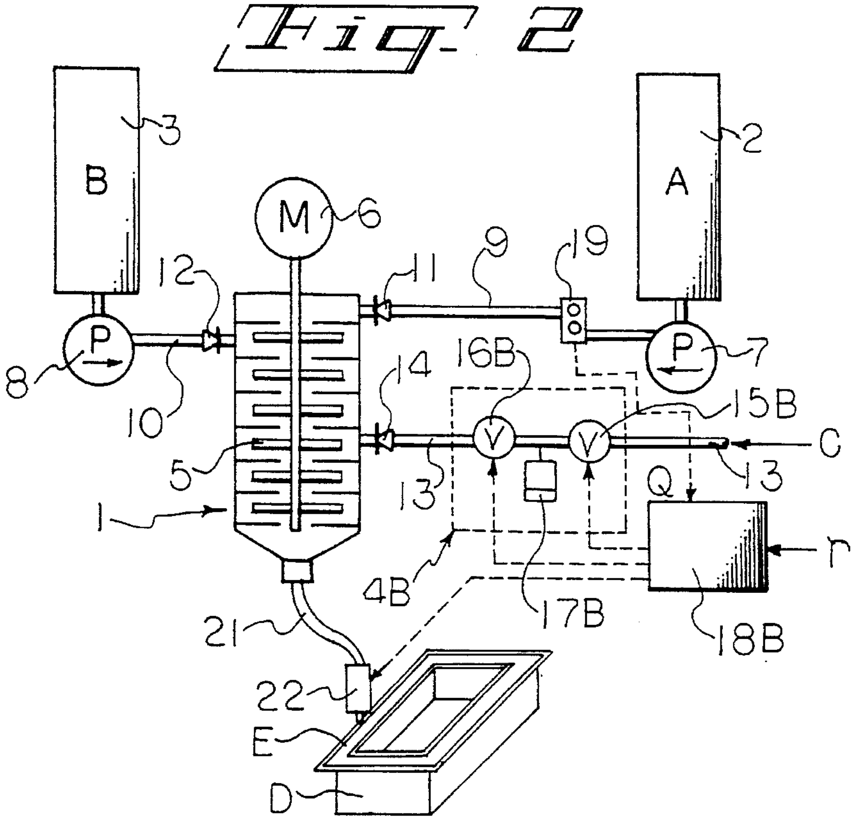
Figure 4:
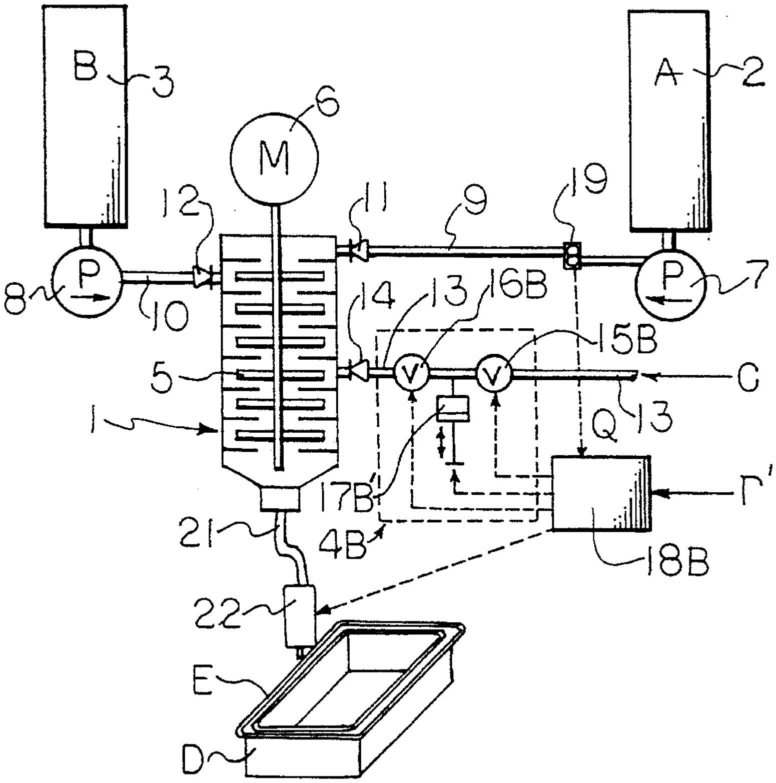
FIGS. 4 and 5 are schematic diagrams showing two alternative embodiments of the gas supply line for the embodiment shown in FIG. 2.
Figure 5:
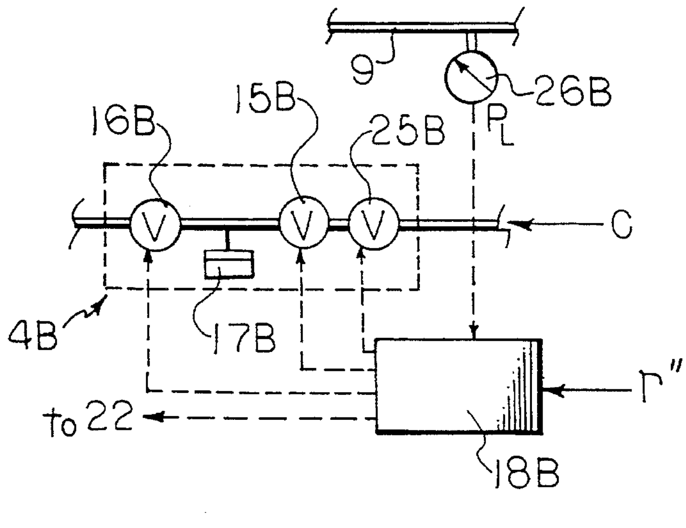

Embodiment B (FIGS. 2, 4 and 5)

This embodiment of the present apparatus provides intermittent and pulsed injections of pressurized gas into the mixing chamber.

The pressurized gas supply line 13 is connected across check valve 14 to the wall in the mid-region of the mixing chamber 1, and an injection rate controller assembly 4B comprising two electrically operated switching valves, 15B and 16B, and a gas storage tank 17B is located between the check valve and the source of the pressurized gas. Switching (on/off) valves 15B and 16B are installed on the intake side and discharge side, respectively, of the injection rate controller assembly 4B. and tank 17B is installed between switching valves 15B and 16B.

In the modification of embodiment B shown in FIG. 4 of the accompanying drawings, the fixed capacity gas storage tank 17B is replaced by a variable capacity tank 17B'

The switching valves 15B and 16B alternately open and close at a specified frequency based on a signal from control element 18B, and the open/close status of each of these valves is always opposite that of the other valve. In specific terms, when switching valve 15B is open, switching valve 16B is closed and a constant volume of pressurized gas C becomes temporarily stored in the tank 17B. When switching valve 15B subsequently closes, switching valve 16B then opens and the pressurized gas C stored in the tank 17B is discharged. The execution of these operations at the specified frequency results in the intermittent and pulsed discharge of pressurized gas from switching valve 16B on the discharge side and thus in its injection as individual pulses through check valve 14 into the high-viscosity liquid in the mixing chamber 1.

The flow controller assembly containing switching valves 15B and 16B and tank 17B, may be combination of separate components as exemplified in FIGS. 2, 4 and 5. Alternatively, an assembly based on a single three-way valve can be used.

Flowmeter 19 installed in high-viscosity liquid supply line 9 sends a signal to control element 18B that indicates the flow rate Q of the base portion of the high-viscosity liquid stored in tank A. The predetermined mixing ratio r is also input to control element 18B.

Control element 18B performs the following two functions: (a) based on the mixing ratio r, control element 18B determines the pressurized gas injection rate q in proportion to the flow rate Q; (b) control element 18B controls an alternating switching between valves 15B and 16B that produces a pulse cycle that will yield this injection rate 1.

Figure 8:
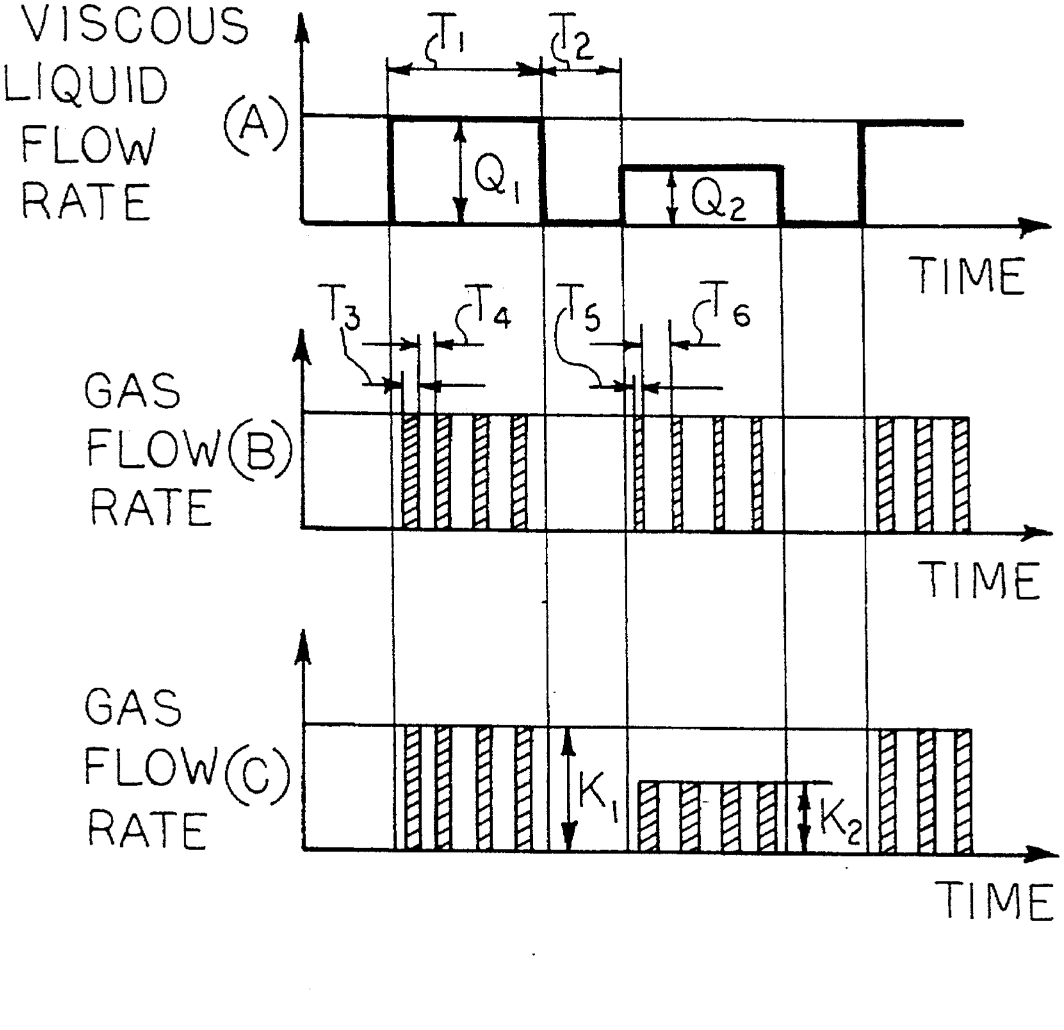
FIGS. 8(A), 8(B) and 8(C) are plots showing the flow rates of a high-viscosity liquid and a pressurized gas as a function of time during intermittent addition of the high viscosity liquid into a mixing chamber in using the apparatus shown in FIGS. 2, 4 and 5.

As a result of the operation of flow control apparatus 4B, when a high-viscosity liquid is fed into the mixing chamber at a variable flow rate as indicated by $Q_1$ and $Q_2$ in FIG. 8(A), the pressurized gas is fed into the mixing chamber as the intermittent series of pulses shown in FIG. 8(B) corresponding to the individual intermittent flow cycles. More specifically, when the high-viscosity liquid has flow rate $Q_1$, the pressurized gas is injected as groups of pulses defined by the injection interval $T_3$ and the interrupt interval $T_4$.

When the flow rate of the high-viscosity liquid falls from $Q_1$ to $Q_2$, the injection interval of the pressurized gas pulse is shortened from $T_3$ to $T_5$ and the interrupt interval is lengthened from $T_4$ to $T_6$.

This instantaneous and pulsed injection of the pressurized gas into the high-viscosity liquid produced by the elements in control apparatus 4B avoids overshoot and avoids a time lag after the start of the high-viscosity liquid feed. In addition, a uniform dispersion is obtained as a result of making the injection rate of the pressurized gas proportional to the flow rate of the high-viscosity liquid.

FIG. 4 depicts a modification of embodiment B, referred to as B'. In this modification, a piston type of variable-capacity tank 17B' replaces the constant-capacity tank 17B installed between switching valves 15B and 16B in the apparatus depicted in FIG. 2. The volume of this variable-capacity tank is varied in proportion to the flow rate Q of the high-viscosity liquid in the high-viscosity liquid supply line 9, which is measured using flowmeter 19.

In embodiment B shown in FIG. 2 the injection rate of the pressurized gas is adjusted by changing the pulse cycle generated by the alternating operation of switching valves 15B and 16B. In embodiment B' illustrated in FIG. 4, the pulse cycle generated by the alternating switching at switching valves 15B and 16 is held constant, and the volume of the variable-capacity tank 17B' is varied by the control element 18B in proportion to the predetermined mixing ratio r' and as a function of the flow rate Q of the high-viscosity liquid in high-viscosity liquid supply line 9.

The principle of operation of this alternative embodiment is the same as the example in FIG. 2 in terms of provided pulsed injection of the pressurized gas, but its injection pattern differs from that of the apparatus depicted in FIG. 2. Thus, as shown in FIG. 8(C), the flow rate during each pulse is varied from $K_1$ to $K_2$ in response to the change from $Q_1$ to $Q_2$ in the flow rate of the high-viscosity liquid that is being intermittently fed into mixing chamber 1. This apparatus is also capable of uniformly dispersing the pressurized gas into the high-viscosity liquid in the mixing chamber.

FIG. 5 depicts a second alternative arrangement of devices in assembly 4B of embodiment B for controlling the flow of pressurized gas. The pressurized gas supply line shown in FIG. 2 is modified by inserting a pressure-control valve 25B between switching valves 15B and the pressurized gas source C and by installing a pressure gauge 26B in the high-viscosity liquid supply line 9.

The pressure gauge 26B detects the feed pressure $P_L$ of the high-viscosity liquid in the high-viscosity liquid supply line 9. The feed pressure of the pressurized gas in pressurized gas supply line 13 is controlled by controlling the size of the aperture of pressure-control valve 25B as a function of the liquid feed pressure $P_L$ and in proportion to the predetermined mixing ratio r". Regulating the pressure in the pressurized gas supply line balances the pressurized gas injection rate with the pressure of the high-viscosity liquid and thereby produces uniform gas/liquid dispersions using the pulsed injection technique shown in plot C of FIG. 8.

Figure 3:
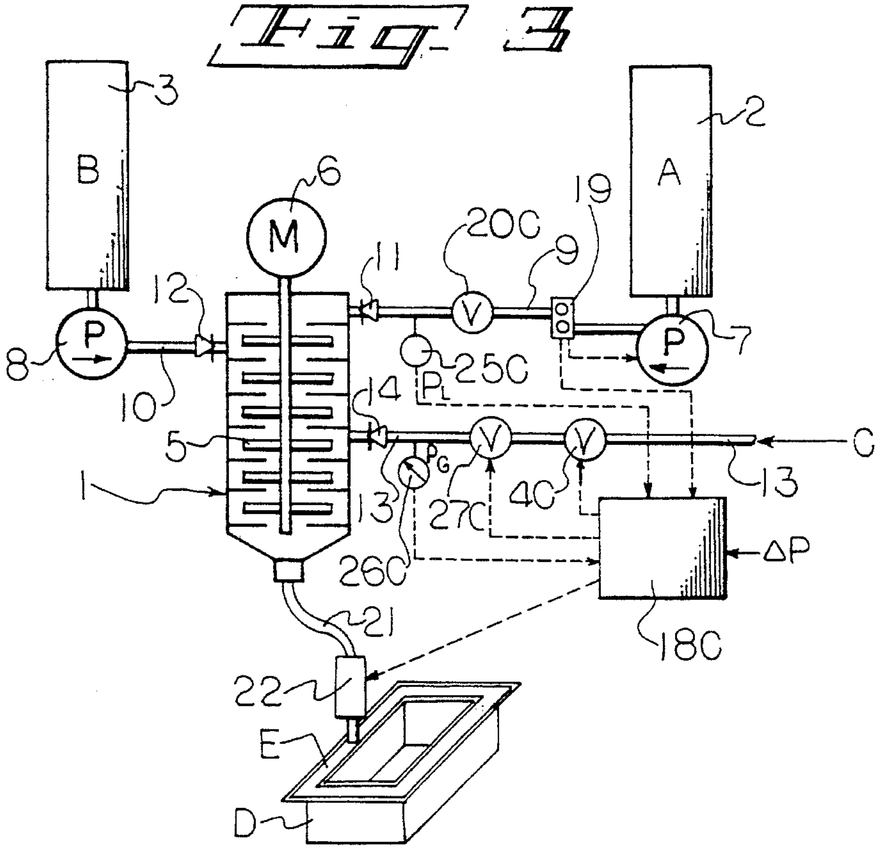

Embodiment C (FIG. 3)

This embodiment of the apparatus used in connection with the present method injects the pressurized gas into the mixing chamber 1 under a feed pressure $P_G$ higher than the high-viscosity liquid feed pressure $P_L$ while providing a substantially constant pressure difference, Δp between these two feed pressures. The value of Δp, is preferably within the range of from 0.1 to 5.0 kg/cm$^2$.

Because Δp can be expressed as a function of the flow rate $Q_L$ of the high-viscosity liquid using the equation $\Delta p = a \times Q_L + b$, wherein a and b are constants, it is evident that this pressure difference Δp must therefore also change when the flow rate $Q_L$ of the high-viscosity liquid changes.

In addition to check valve 11 and flow meter 19 present in embodiments A and B of the present apparatus, the liquid supply line 9 of embodiment C also contains a pressure gauge 25C and an electrically operated switching valve 20C.

The pressurized gas supply line 13 of embodiment C is connected across check valve 14 to the wall of the mixing chamber 1 at the middle of this chamber. The pressurized gas supply line 13 contains a pressure control valve 4C, switching valve 27C, and pressure gauge 26C.

Pressure gauge 25C located in the high-viscosity liquid supply line 9 measures the feed pressure $P_L$ of the high-viscosity liquid, while pressure gauge 26C in the pressurized gas supply line 13 measures the feed pressure $P_G$ of the pressurized gas. The operation of switching valve 27C is synchronized with the opening and closing of discharge nozzle 22 as follows: switching valve 27C is open and pressurized gas is fed into the mixing chamber 1 when the discharge nozzle 22 is open. Switching valve 27C is closed, shutting of the supply of pressurized gas to the mixing chamber, when discharge nozzle 22 is closed.

High-viscosity liquid feed pump 7, whose rotation rate is controlled by a signal from flowmeter 19, governs the feed pressure $P_L$ of the high-viscosity liquid. Control element 18C receives the feed pressure $P_L$ signal for the high-viscosity liquid from the pressure gauge 25C and also receives the signal based on the predetermined pressure difference, Δp. Based on these two signals, control element 18C transmits a throttle signal to pressure control valve 4C which has the effect of making the pressurized gas feed pressure $P_G$ exceed the high-viscosity liquid feed pressure $P_L$ by the predetermined constant pressure difference Δp. The pressurized gas C is injected under this feed pressure $P_G$ control across check valve 14 into the high-viscosity liquid in the mixing chamber 1.

Injection of the pressurized gas C under a pressure $P_G$ controlled as described in the immediately preceding paragraph makes possible a uniform injection of the pressurized gas, as shown in FIG. 7(B), in which the pressurized gas does not exhibit a time lag or significant overshoot relative to the intermittent feed of the high-viscosity liquid into the mixing chamber 1.

The composition of the high-viscosity liquids referred to as A and B in the accompanying drawings is not critical to the present invention. The present method is particularly effective when used to prepare foamable organosiloxane compositions that cure by a condensation reaction with the simultaneous evolution of gas, typically hydrogen, that functions as a blowing agent for the composition. The organosiloxane compositions preferably comprise the following ingredients:

a base portion comprising a curable polyorganosiloxane containing at least 2 silanol groups in each molecule, preferably a silanol-terminated polydiorganosiloxane, and a condensation-reaction catalyst selected from the group consisting of metals from the platinum group of the periodic table, compounds of these metals and organotin compounds;

a curing agent portion comprising the same polyorganosiloxane present in the base portion and an organohydrogensiloxane containing at least 3 silicon-bonded hydrogen atoms in each molecule.

This curable composition forms a foam by entrapping at least a portion of the hydrogen generated as a by-product of the curing reaction.

Preferred base compositions (referred to herein as liquid A) used in accordance with the present method comprise a platinum compound as the curing catalyst and at least one silanol-terminated polydiorganosiloxane; the curing agent portion, referred to as liquid B, comprises the same silanol-endblocked polydiorganosiloxane present in liquid A and an organohydrogensiloxane containing at least three silicon-bonded hydrogen atoms in each molecule. The base and curing agent portions are typically combined in a volumetric ratio of about 1:1.

Other foams that can be prepared using the present include but are not limited to flexible and rigid polyurethane foams. These foams are prepared from a base agent comprising diisocyanate or polyisocyanate and a curing agent comprising the mixture of polyol and water.

Likewise, no specific restrictions apply to the nature of the pressurized gas supplied to the mixing chamber in accordance with the present method, so long the gas will not react with the ingredients of the high viscosity liquid. Suitable gases include but are not limited to nitrogen, helium, argon and carbon dioxide. Among these gases, air is particularly preferred for its ease of handling.

That which is claimed is:

1. A method for preparing and dispensing a foamable composition by blending a pressurized gas with a high viscosity liquid in a mixing chamber to which is connected the outlet of at least one liquid supply line for said liquid, the outlet of a high pressure supply line for the introduction of said gas into said chamber and a nozzle for dispensing said composition from said chamber, wherein said high pressure supply line contains means for regulating the flow of gas in said high pressure supply line to provide a predetermined ratio between the flow rates of said gas and liquid, wherein said means comprise at least one electrically actuated valve that is actuated by a first electrical signal generated by a control element, wherein the presence and duration of said signal is a function of a) a second electrical signal received by said control element, said second signal being a function of the flow rate of said liquid in said liquid supply line and b) a third electrical signal received by said control element that is a function of a predetermined variable which is either the difference between the feed pressures for said gas and said liquid or the ratio between the volumes of said liquid and said gas to be combined in said mixing chamber, and wherein the flow rate of said gas in said gas supply line is controlled as a function of the flow rate of the high-viscosity liquid in said liquid supply line to obtain a predetermined volume ratio for said gas relative to said liquid, and the starting time for introduction of said gas into said mixing chamber is adjusted to precede by from 0.1 to one second the starting time for the introduction of said liquid into said mixing chamber.

2. A method according to claim 1 wherein the high-viscosity liquid and pressurized gas are intermittently introduced into said mixing chamber in a mutually synchronized manner.

3. A method according to claim 1 wherein said gas is continuously supplied into the pressurized gas supply line and passes through a switching valve that selectively alternates the flow path of said gas between said mixing chamber and the atmosphere adjacent to the outside of said chamber, wherein said switching valve is installed between said flow rate controller and the point of connection of said pressurized gas supply line to said mixing chamber, and wherein said switching valve directs said gas into said mixing chamber when said high-viscosity liquid is being fed into said mixing chamber and directs said gas into atmosphere outside of said chamber when the supply of said liquid into said mixing chamber is discontinued.

4. A method according to claim 3 wherein a relief valve is located in the flow path from said switching valve to the atmosphere and said relief valve is adjusted to open when the pressure of said pressurized gas exceeds the injection pressure of the high-viscosity liquid.

5. A method according to claim 1 wherein the viscosity of the high-viscosity liquid is at least 1,000 centipoise (1 Pa.s) and the mixing ratio of said pressurized gas relative to said liquid is from 0.5 to 50 cc of said gas, measured at standard temperature and pressure, per 100 g of said high-viscosity liquid.

6. A method according to claim 5 wherein the flow rate of the pressurized gas into said mixing chamber is from 0.02 to 20 cc per minute, measured at standard temperature and pressure.

7. A method according to claim 1 wherein a stirring means is located in said mixing chamber and the pressurized gas is injected into the high-viscosity liquid while said liquid is being stirred by said stirring means.

8. A method according to claim 1 wherein the viscous liquid is a foamable organosiloxane composition that cures by the reaction of silicon-bonded hydrogen atoms with silicon-bonded hydroxyl groups.

9. A method according to claim 8 wherein said composition comprises a base portion and a curing agent portion, and said pressurized gas is air.

10. A method according to claim 9 wherein said base portion comprises a curable polyorganosiloxane containing at least 2 silanol groups in each molecule and a condensation-reaction catalyst selected from the group consisting of metals from the platinum group of the periodic table, compounds of these metals and organotin compounds, and the curing agent portion comprises the same polyorganosiloxane present in the base portion and an organohydrogensiloxane containing at least 3 silicon-bonded hydrogen atoms in each molecule.

* * * * *